UNITED STATES PATENT OFFICE.

HENRY MARTYN, OF BOSTON, MASSACHUSETTS.

IMPROVEMENT IN COMPOSITIONS FOR COATING LEATHER.

Specification forming part of Letters Patent No. 167,183, dated August 31, 1875; application filed December 7, 1874.

*To all whom it may concern:*

Be it known that I, HENRY MARTYN, of Boston, of the county of Suffolk and State of Massachusetts, have invented a new and useful Composition for Coloring Leather, or for other purposes in the arts; and do hereby declare the same to be described as follows:

The said composition is composed of water, shellac, spirits of ammonia, and the new aniline pigment or color known in commerce as "Pourrier's D blue aniline," and sometimes called "new aniline-black," which, when used with the ammoniacal solution of shellac described, and in proper quantity, produces a black.

In making the composition, I usually take, for twenty-four ounces of shellac and six gallons of water, one pound of spirits of ammonia and eight ounces of the aforesaid aniline color, and thoroughly mix or stir the whole together, the water being heated at or about a temperature of 212° Fahrenheit.

I do not claim a dressing for leather composed of spirit varnish and aniline fuscine, either with or without the addition of aniline-blue or bronzed powder; nor do I claim a dressing for leather consisting of an extract of logwood, borax, gum-shellac, bichromate of potash, and spirits of ammonia, or an alkaline solution of shellac with a solution of logwood.

I make use of boiling water, in large quantity, as set forth, with the shellac, the spirits of ammonia, and the aniline color, whereby I combine the said ingredients quicker and to great advantage. I am not obliged to make or use any extract or solution of any wood, such as logwood, and consequently I save the labor and expense of such; and besides, in my composition, I am not restricted to, nor do I use, the color resulting from logwood, as I employ an aniline color far superior in every respect. I make no use of aniline fuscine, nor spirit varnish, as usually prepared, although I use spirits of ammonia.

I claim—

The improved leather dressing compound, consisting of an ammoniacal solution of shellac and the new aniline color of Pourrier, compounded essentially as set forth.

HENRY MARTYN.

Witnesses:
R. H. EDDY,
J. R. SNOW.